STRIP TRANSFER MECHANISM AND MAGNETIC RECORDER EMBODYING SAME

Filed March 6, 1968 3 Sheets-Sheet 1

George R. Luckey
*INVENTOR.*

BY Donald R. Nyhagen

ATTORNEY

George R. Luckey
INVENTOR.

BY Donald R. Nykagen
ATTORNEY

STRIP TRANSFER MECHANISM AND MAGNETIC RECORDER EMBODYING SAME

Filed March 6, 1968 3 Sheets-Sheet 3

INVENTOR.
George R. Luckey
BY
Donald R. Nyhagen
ATTORNEY

United States Patent Office 3,510,080
Patented May 5, 1970

3,510,080
STRIP TRANSFER MECHANISM AND MAGNETIC RECORDER EMBODYING SAME
George R. Luckey, Canoga Park, Calif., assignor to TRW Inc., Redondo Beach, Calif., a corporation of Ohio
Filed Mar. 6, 1968, Ser. No. 711,047
Int. Cl. G03b *1/04;* G11b *15/32*
U.S. Cl. 242—54.1 24 Claims

ABSTRACT OF THE DISCLOSURE

A transport mechanism for a long flexible strip, such as wire or tape, having a pair of stationary coaxial reels about which the strip is wound in opposite directions, and a strip transfer means including a guide through which the strip passes from one reel to the other and which is synchronously driven in rotation about and reciprocated along the common axis of the reels in such a way that the strip is simultaneously unwound from one reel and wound on the other reel. Information recording and retrieving apparatus embodying the transport mechanism.

BACKGROUND OF THE INVENTION

Field of the invention

This invention relates generally to a strip transport mechanism and more particularly to such a mechanism wherein a strip is fed between stationary reels. The invention relates also to information recording and retrieving apparatus embodying the transport mechanism for longitudinally feeding a flexible information storage member past a scanning head.

As will appear from the ensuing description, the present transport mechanism may be utilized to feed or transport any one of a variety of long flexible strip-like elements between stationary supporting reels about which the ends of the element are wound. In this regard, attention is directed to the fact that the term "strip" is used in a generic sense in this disclosure to encompass wires, tapes, and other strip and strip-like elements. However, the principal application to the invention involves feeding a long flexible information storage member through an information recording and retrieving station, referred to herein simply as a scanning station. For this reason, the invention will be disclosed in connection with this application. More specifically, the invention will be disclosed in connection with a magnetic wire flight data recorder for commercial airlines.

Prior art

Some years ago, the Civil Aeronautics Board issued regulations which require installation of recorders on commercial airlines for recording certain flight data, such as air speed, altitude, flight direction, vertical acceleration, and time, which may be analyzed in the event of a crash to determine the cause of the crash. As a consequence of these regulations, a variety of flight data recorders have been devised. These existing crash recorders, however, either fail to meet the flight recorder requirements or are not completely satisfactory for other reasons. For example, various magnetic records have been proposed which utilize a magnetic Mylar tape as the recording medium. This type of recording medium is unsatisfactory for the reason that it is incapable of withstanding the temperature conditions set forth in the regulations which require survival of the recording medium for a period of 30 minutes at a temperature of 1100° F. Another proposed magnetic recorder employs, as the recording medium, a Vicalloy metal tape. This tape is superior to a Mylar tape because of its ability to survive the high temperature conditions, just mentioned. Nevertheless, Vicalloy tape is not acceptable as a recording medium for magnetic flight recorders since it presents certain intertrack azimuth alignment problems. These problems can be resolved only by recording and reproducing flight data information with the same magnetic head alignment. Such uniformity of head alignment during recording and reproducing is extremely difficult if not impossible to obtain in a flight recorder for the reason that the magnetic head alignment is generally disturbed by the impact of a crash or the high temperatures resulting from a fire after the crash. Also, Vicalloy recording tape is extremely costly. Such tape, for example, runs on the order of $1.00 per linear foot, and approximately 500 feet of tape are required for a 24-hour flight recording period. In addition, the multitrack magnetic heads for recording and reproducing information on the tape cost on the order of $2,000 each.

Another type of existing flight recorder, and that which is in current use in commercial aircraft, uses a metal foil as the recording medium and a stylus as the recording element. While such a foil recorder satisfies the existing flight recorder regulations of the Civil Aeronautics Board, it is not completely satisfactory because of its low data storage capacity and its requirements of visual data readout and interpretation. Moreover, a new set of flight data recorder requirements and regulations are being formulated which will not be satisfied by the existing foil recorders. For example, in addition to the crash survival requirements of the existing regulations, the proposed regulations contemplate sophisticated recording techniques which may be used, as well, for operational performance analysis and optimization and maintenance recording.

SUMMARY OF THE INVENTION

This invention provides an improved strip transport mechanism whose primary application is a magnetic wire figh data recorder. In connection with this particular application, it will become evident as the description proceeds that the present flight recorder is devoid of the above noted and other deficiencies of the existing flight recorders. Moreover, the recorder possesses various unique and highly beneficial features which render the recorder ideally suitable for commercial airline use. For example, the present recorder is characterized by a high degree of impact and temperature resistance, such that the recorder is capable of surviving virtually any airplane crash. In addition, the recorder is characterized by voluminous digital data storage capacity as well as certain desirable operating features and optimum data recording and reproducing characteristics which uniquely adapt the recorder for both crash data recording and normal operational and maintenance data recording.

In general terms, the present transport mechanism is characterized by a pair of stationary coaxial reels around which are wound, in opposite directions, the ends of the strip to be fed. Supported for rotation about the common axis of the reels is a strip guide through which the strip passes from one reel to the other. Means are provided for selectively driving the guide in either direction of rotation about the axis. As the guide rotates, the strip is concurrently unwound from one reel and wound on the other reel in a manner such that the strip undergoes endwise movement through the guide. According to a feature of the invention, the guide may be reciprocated axially in synchronism with its rotation to effect coiling of the strip in uniform layers on the reels. According to a further feature of the invention, a strip tensioning means may be coupled to one reel for constantly urging the latter in a direction to maintain a generally uniform tension in the strip, and compensate for the changes in effective diameters of the reels which occur as the strip is fed from one reel to the other.

In the present flight data recorder, the driven strip is an information recording medium, specifically a magnetic recording wire. The rotary guide through which the recording wire passes from one supporting reel to the other is mounted on a rotary carrier which also mounts a magnetic recording and reproducing head. This head, hereinafter referred to simply as a scanning head or magnetic head, is situated at a scanning station located along the path of movement of the recording wire through the wire guide, in magnetic recording and reproducing relation to the wire. As a consequence, rotation of the carrier is effective to feed the wire from one reel to the other and past the magnetic head in such a way that information may be magnetically recorded on and retrieved from the wire.

As noted earlier, while the transport mechanism of the invention is particularly designed for use in the present flight data recorder, it may be used for a variety of other purposes. For example, the transport mechanism may be employed simply to wind wire or other strip material in coils. Also, the transport mechanism may be utilized in information storage and retrieving apparatus other than a magnetic wire recorder. Thus, the driven strip or information storage member may be a tape, film or the like on which information is recorded magnetically, optically, by perforating or otherwise marking the tape, or in any other acceptable manner by means of a suitable scanning head located at the scanning station.

DESCRIPTION OF THE PREFERRED EMBODIMENTS

Figure 3:
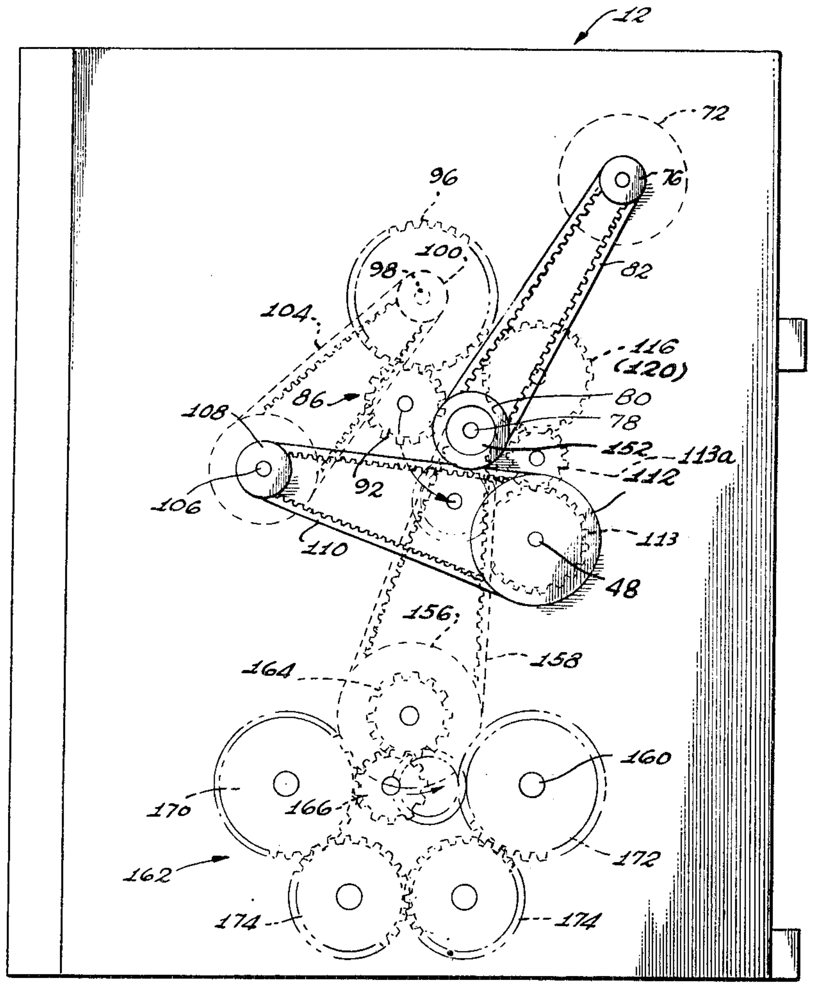
FIG. 3 is an end elevation of the wire recorder as viewed from the left in FIG. 2.

In general terms, the invention provides a strip transport mechanism, represented in the drawings by the transport mechanism 10, having a frame 12 mounting a pair of essentially fixed reels 14 and 16. Reels 14 and 16 are disposed in coaxial side-by-side relation. Extending between the reels is a long flexible driven strip 18. The ends of this strip are secured to and wound in opposite directions about the reels 14, 16. Transport means 20 are provided for feeding the strip 18 endwise from one reel to the other. This transport means includes a strip guide 22 through which the strip 18 passes from one reel to the other. Guide 22 is fixed to a carrier 24 rotatably mounted on the frame 12 for turning on the common axis 26 of the reels 14, 16. Referring particularly to FIG. 3, it will be observed that the strip guide 22 extends transverse to the plane of rotation of the carrier 24 and has ends ***22a*, *22b* which open toward the reels 14, 16, respectively. Preferably, these guide ends open generally tangentially of the reels in the directions in which the ends of the strip 18 are wound about the reels. Driveably coupled to the carrier 24 are means 28 for driving the carrier, and hence the strip guide 22, in rotation about the common reel axis 26**.

It is evident from the description thus far that rotation of the strip guide 22 with the carrier 24 is effective to feed the driven strip 18 endwise from one reel 14, 16 to the other. Thus, rotation of the guide in the clockwise direction in FIG. 1 feeds the strip from reel 14 to reel 16. Rotation of the guide in the opposite direction feeds the strip from reel 16 to reel 14. During this feeding of the strip from one reel to the other, the strip undergoes endwise movement through the guide.

For reasons which will become evident as the description proceeds, it is desirable to maintain a generally uniform tension in the driven strip 18. To this end, the transport mechanism 10 is equipped with a strip tensioning means 30 which is operatively connected to one of the reels 14, 16, in this instance reel 14, for urging the latter reel in the direction in which the strip 18 is wound about the reel. As will appear from the ensuing description, this tensioning means produces a torque on the reel 14 of such magnitude as to maintain a generally uniform tension in the strip 18.

It will be recalled that the present transport mechanism may be employed for various applications but it is intended primarily for use in an information recording and retrieving mechanism. In this case, the driven strip 18 constitutes an information storage medium, and the carrier 24 mounts a scanning head 32 which is located between the ends ***22a*, *22b* of the strip guide 22 in information recording and reproducing relation relative to the path of motion of the information storage medium through the guide. Reel 14 is a supply reel on which the information storage strip or medium 18 is initially wound. The reel 16 constitutes a takeup reel. In the information recording and reproducing mode of the illustrated mechanism, the carrier 24 may be driven at a relatively slow uniform speed in a direction to unwind the information storage medium 18 from the supply reel 14 and wind the medium on the takeup reel 16. During this forward transfer of the information storage medium from one reel to the other, the medium undergoes relatively constant speed endwise movement through the guide 22 and past the scanning head 32. This scanning head is then activated to record information on or retrieve information from the storage medium, depending upon whether the mechanism 10 is operated in its recording or reproducing mode. In this particular application of the invention, the carrier drive means 28 embodies forward driving means 34 for driving the carrier 24 at the appropriate constant speed and in the appropriate direction to feed the information storage medium 18 at the proper information recording and reproducing speed from the supply reel 14 to the takeup reel 16 and rewind driving means 36** for driving the carrier at a relatively high speed in the opposite direction to effect rapid rewind of the storage medium on the supply reel. Alternatively in some applications of the invention such as the aircraft recorder application to be explained presently, recording may occur during relatively slow forward transfer of the recording medium from the supply reel to the takeup reel and playback may occur during rapid rewind of the recording medium from the takeup reel to the supply reel.

As noted earlier, the present information recording and retrieving mechanism may be employed to record information on and retrieve information from various types of information storage media. In this instance, the information storage medium 18 is a magnetic recording wire. The scanning head 32 is a magnetic recording and reproducing head. The illustrated mechanism 10, therefore, is a magnetic wire recorder which, as already noted, is particularly suited for use as a flight data recorder for installation in commercial airlines. In this regard, it will become evident from the ensuing description that the illustrated flight data recorder is uniquely constructed and arranged to satisfy the stringent requirements imposed on such recorders by the current and proposed Federal regulations. One feature of this illustrated recorder resides in the fact that the carrier 24, and hence the strip or wire guide 22, is supported on the frame 12 for reciprocation along the common axis 26 of the reels 14, 16. Shuttle means 38 are provided for reciprocating the carrier about the axis and in such a way that the magnetic recording wire 18 is wound on the reels 14, 16 in uniform multicoil layers. It will be evident, of course, that the shuttle means will not be required when the strip being transported is a flat strip, such as a tape.

Referring now in more detail to the drawings, the strip transport mechanism or wire recorder 10 which has been selected for illustration has a frame 12 including a base plate 40. Rising from this plate are a number of supporting walls 42, 44, and 46 disposed in spaced parallel relation. For convenience, these walls are hereinafter referred to as front, center, and rear walls, respectively. The supply reel 14 is bolted or otherwise rigidly secured to the front side of the center wall 44. Extending coaxially through the supply reel 14 and through the center and rear walls 44, 46 is a shaft 48. This shaft is rotatably supported in the center and rear walls by bearings 50. The forward end of shaft 48 extends forwardly of the supply reels 14 and terminates about mid-way between the front side of this reel and the rear side of the front wall 42. Rotatably supported on the front end of the shaft 48, by bearings 52, is a sleeve 54. A hollow shaft 56 is rigidly secured to the front end of and extends forwardly from the sleeve 54 along the axis of the shaft 48. The front end of the shaft 56 extends through and is rotatably supported by a bearing 58 in the front wall 42. Takeup reel 16 is located between the front wall 42 and the sleeve 54 and is rotatably supported on the shaft 56. Collars 60 are secured to the shafts 48, 56 in the places illustrated for restraining these shafts against axial movement.

Figure 2:
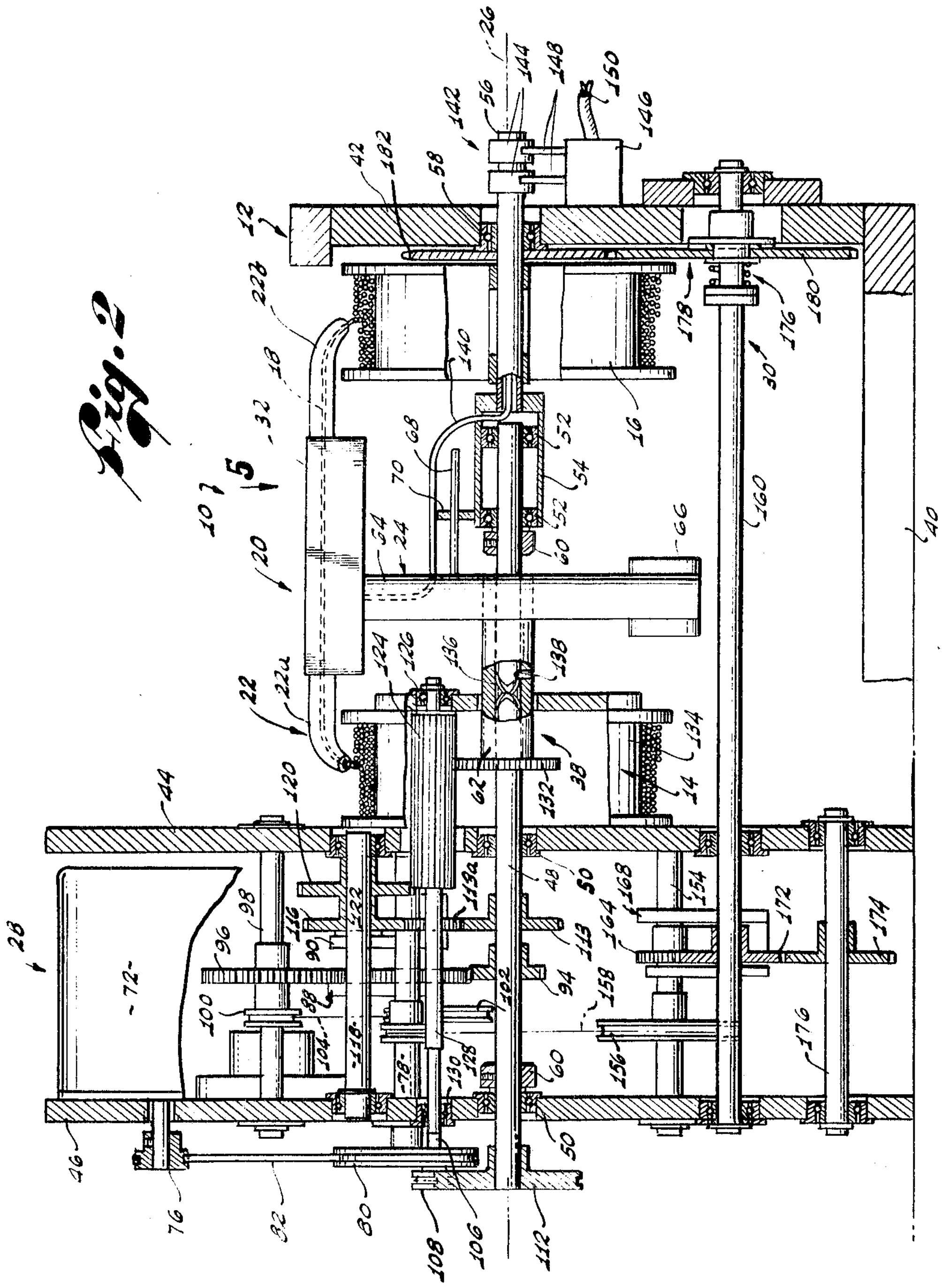
FIG. 2 is a longitudinal section through the wire recorder.

The rotary carrier 24 of the strip or wire transport means 20 is located between the supply reel 14 and the takeup reel 16 and has a sleeve 62 rotatably supported on the shaft 48. Rigidly secured to the front end of the sleeve 62 is an arm 64. Arm 64 extends in opposite radial directions from the sleeve 62. The upper end of the arm 64 in FIG. 2 mounts the strip or wire guide 22 and the scanning head 32. The wire guide and scanning head will be described presently. Fixed to the lower end of the arm 64 is a counterweight 66 which provides the carrier 24 with both static and dynamic balance. For reasons which will be explained presently, the carrier 24 is connected to the sleeve 54 in such a way as to effect unified rotation of the carrier and sleeve while permitting axial reciprocation of the carrier relative to the sleeve. To this end, the carrier is provided with a rigid drive pin 68 which extends axially from the carrier and slidably through a bore in a radial drive arm 70 on the sleeve.

It is evident at this point that the supply reel 14 is fixed against rotation relative to the recorder frame 12. The takeup reel 16, on the other hand, is free to rotate relative to the frame. The carrier 24 is supported on the frame for rotation about and reciprocation along the common axis 26 of the reels.

It will be recalled that the transport mechanism or recorder 10 is equipped with drive means 28 for rotating the carrier 24 and with shuttle means 38 for reciprocating the carrier in timed relation to its rotation. It will become evident as the description proceeds that a variety of drive and shuttle means may be employed for this purpose. The particular carrier drive means 28 illustrated includes a drive motor 72 which is rigidly mounted on the front side of the rear frame wall 46 in laterally spaced relation to the shaft 48. The motor shaft 74 extends through the rear wall and mounts a pulley 76. Extending through the center and rear frame wall 44, 46 in spaced parallel relation to the axis of the drive motor 72, and rotatably supported in the walls, is a main drive shaft 78 mounting a pulley 80 at its rear end. A drive belt 82 is trained about the motor pulley 76 and the drive shaft pulley 80, whereby the shaft is driven in rotation by the motor. Fixed to the drive shaft 78 between the walls 44, 46 is the input or driving gear 84 of a flip-flop or automatic torque responsive variable ratio transmission 86 for drivably coupling the motor 72 to the scanning head carrier 24. This transmission is effective to couple the motor to the carrier with one speed ratio in response to rotation of the carrier in one direction by the motor and with another speed ratio in response to rotation of the carrier in the opposite direction by the motor. To this end, the transmission 86 includes a generally U-shaped idler pinion carriage 88 (FIG. 4) having arms 90 which are rotatably supported with a light friction fit on the main driving shaft 78 is straddling relation to the shaft gear 84. Rotatably supported on this carriage, with its axis parallel to the shaft, is an idler pinion 92 meshing with the gear 84. Because of the light friction fit of the carriage arms 90 on the shaft 78, the carriage 88 tends to rotate with the shaft. Rotation of the shaft 78 in the counterclockwise direction in FIG. 1 swings the pinion carriage 88 in this direction to a position wherein its idler pinion 92 meshes with a gear 94 fixed on the carrier supporting shaft 48. The gears 84, 94 and idler 92 mesh in such a way that the forces then active on the gears and idler retain the same in meshing engagement. It will be observed that the carrier shaft 48 is then driven in the same counterclockwise direction as the shaft 78. This direction of rotation of the shaft 48 is hereinafter referred to as its rewind direction. As will appear from the ensuing description, such rewind rotation of the shaft 48 is effective to feed the recording wire 18 from the takeup reel 16 to the supply reel 14.

Figures 1, 4, 6:
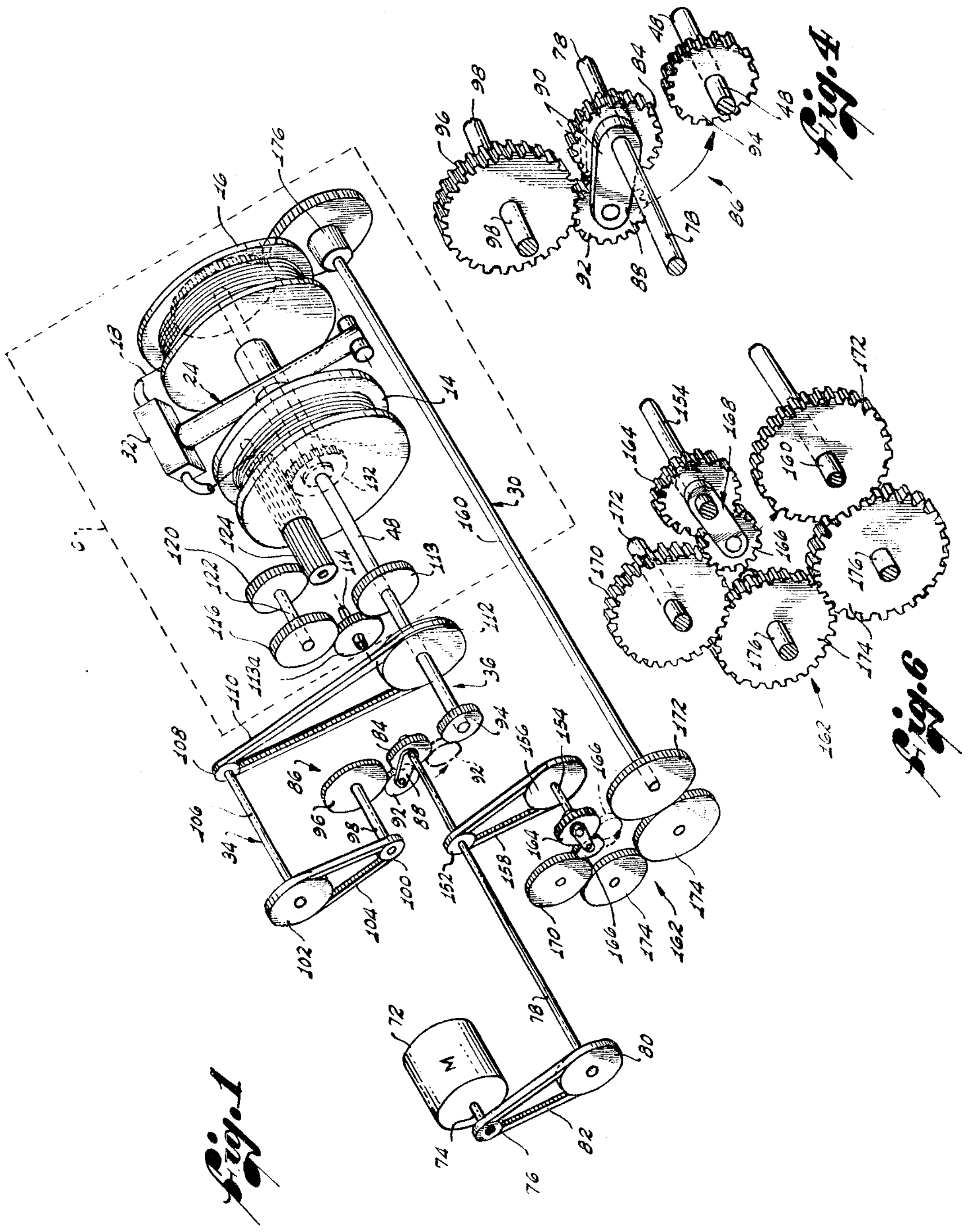
FIG. 1 diagrammatically illustrates a wire recorder embodying a strip transport mechanism according to the invention.
FIG. 4 diagrammatically illustrates an automatic variable ratio transmission embodied in the strip transport mechanism.
FIG. 6 diagrammatically illustrates an automatic reversing mechanism embodied in the strip transport mechanism.

Reverse rotation of the main drive shaft 78 by the motor 72 in the clockwise direction in FIG. 1 swings the idler carriage 88 in this direction to a position wherein its idler pinion 92 meshes with a gear 96. Gear 96 is fixed to a shaft 98 which extends between and is rotatably supported at its ends in the frame walls 44, 46 in spaced parallel relation to the shafts 48, 78. As before, the driving forces active on the gears 84, 96 and the idler 92 retains the same in meshing engagement. Accordingly, shaft 98 is driven in the same clockwise direction as the shaft 78. Fixed on the shaft 98 is a pulley 100 around which and a larger pulley 102 is trained a drive belt 104. Pulley 102 is fixed to an idler shaft 106 which extends between them and is rotatably supported at its ends in the frame walls 44, 46 in spaced parallel relation to the shafts 48, 78, and 98. The rear end of the shaft 106 extends rearwardly of the rear frame wall 44 and mounts a pulley 108. A drive belt 110 is trained about pulley 108 and a larger pulley 112 fixed on the scanning head carrier supporting shaft 48. It will be observed that when the idler pinion 92 meshes with the transmission gear 96, the shaft 48 is driven from and in the same clockwise direction as the shaft 78. This direction of shaft rotation is hereinafter referred to as its forward direction. As will appear from the ensuing description, rotation of the shaft 48 in this forward direction is effective to feed the recording wire 18 from the supply reel 14 to the takeup reed 16.

It is evident from the description thus far that when the motor 72 is energized to drive the main shaft 78 in the clockwise direction in FIG. 1, the torque responsive transmission 86 shifts automatically to a position wherein the transmission idler pinion 92 meshes with the transmission gear 96 to effect driving of the scanning head carrier supporting shaft 48 in its forward direction. When the motor 72 is energized to drive the main shaft 78 in the counterclockwise direction, the transmission 86 again shifts automatically to a position wherein the transmission idler 92 meshes with the transmission gear 94 to effect driving of the carrier shaft 48 in its rewind direction. As is clearly evident from FIG. 1, the carrier shaft 48, when driven in its forward direction from the main shaft 78, rotates at a substantially slower speed than the main shaft 78. On the other hand, when the carrier shaft 48 is driven in its rewind direction from the main shaft 78, the carrier shaft rotates at substantially the same speed as the main shaft. It will be recognized at this point that the gear 84, idler pinion 92, and gear 96 of the transmission 86 together constitute the forward carrier driving means 34, referred to earlier. The gear 84, idler pinion 92, and gear 94 constitute the rewind means 36.

Fixed on the carrier shaft 48 is a gear 113 which meshes with an idler pinion **113*a* supported for rotation by a shaft 114 extending between and secured to the frame walls 44, 46 in spaced parallel relation to the carrier shaft. Pinion 113*a*, in turn, meshes with a gear 116 rotatably supported on a shaft 118. Shaft 118 extends between and is secured at its ends to the frame walls 44, 46 in spaced parallel relation to the shafts 48, 114. Also rotatable on the shaft 118, forwardly of the gear 116, is a gear 120. Gears 116, 120 are rigidly joined by an intervening hub 122, whereby these gears rotate in unison. Gear 120 meshes with a pinion 124 which is elongated in its axial direction and extends forwardly through the frame wall 44 and the fixed supply reel 14. The front end of the pinion 124 is rotatably supported by a bearing 126 in the front wall of the supply reel. Integrally formed with and extending rearwardly from the pinion is a stepped shaft 128, the rear end of which is rotatably supported by a bearing 130 in the rear frame wall 46. Pinion 124 extends in spaced parallel relation to the carrier shaft 48 and meshes with a gear 132 rigid on the rear end of the scanning head carrier hub sleeve 62. In this regard, it will be observed that the carrier sleeve 62, as well as the carrier shaft 48, extends through a central opening in the front wall of the supply reel 14. It will also be observed that the supply reel has a hollow cylindrical hub 134 defining an interior space within the reel which contains the pinion 124 and carrier gear 132**.

It is now evident that the scanning head carrier 24 is drivably coupled to the carrier shaft 48 through the gear train 113, **113*a*, 116, 120, 124, and 132 for rotation with the shaft. Referring to FIG. 1, it will be observed the gears of this train mesh in such a way that the carrier rotates in the same direction as the carrier shaft. It will be recognized at this point that the main drive motor 72 and the several gears, sprockets, and sprocket chains, described above, which drivably couple the motor to the carrier 24 together constitute the carrier drive means 28 referred to earlier. According to the present invention, this drive means is designed, by selection of the proper gear and pulley ratios, to drive the carrier 24** in its forward direction of rotation at a relatively slow, optimum magnetic recording and playback speed. The drive means is further designed to rotate the carrier in its rewind direction at a relatively high rate of speed. By way of example, the forward rotational speed of the carrier may be on the order of 30 r.p.m. and the rewind speed of the carrier may be on the order of 450 r.p.m.

As noted earlier, the present transport mechanism or wire recorder 10 is equipped with shuttle means 38 for driving the scanning head carrier 24 in reciprocation along and in timed relation to rotation of the carrier about the common axis 26 of the supply and takeup reels 14. 16. In this regard, it is significant to observe that the carrier gear 132 is free to move axially along the pinion 124 while the gear is being driven from the pinion. As a consequence, the carrier 24 is capable of axial reciprocation along the carrier shaft 48 during rotation of the carrier by the shaft. The illustrated shuttle means 38 for driving the carrier in reciprocation comprises a double helix groove 136 which is machined into the portion of the carrier shaft 48 surrounded by the carrier hub sleeve 62. Secured to the sleeve is a follower 138 which slidably engages within the helix screw 136. It will be immediately recognized that the helix groove 136 and follower 138 together constitute a conventional reciprocating mechanism which is effective to drive the carrier hub sleeve 62, and hence the carrier 24, in axial reciprocation relative to the carrier shaft 48 in response to relative rotation of the shaft and hub sleeve, such that the follower is caused to travel back and forth along the helix groove. This relative rotation of the carrier shaft 48 and helix follower 138 is accomplished by providing the carrier-carrier shaft gear train 113, **113*a*, 116, 120, 124, and 132 with other than a 1 to 1 ratio. In the illustrated embodiment of the invention, for example, the ratio of this gear train is on the order of 10:9 to provide the carrier 24 with a reciprocating speed related to the rotary speed of the carrier and the wire diameter, such as to wind the wire 18 in uniform layers on the reels 14, 16. It is now evident, therefore, that the motor 72 is effective to drive the scanning head carrier 24 in rotation about the common axis 26 of the supply and takeup reels 14, 16** and to simultaneously drive the carrier in reciprocation along the axis in timed relation to its rotation. The carrier, of course, is reciproated during rotation in both its forward and rewind directions.

Figure 5:
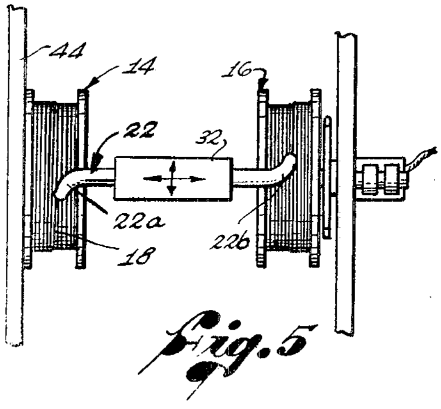
FIG. 5 is a view, on reduced scale, looking in the direction of the arrow 5 in FIG. 2.

Turning now to the carrier 24 itself, it will be recalled that the carrier mounts a strip or wire guide 22 and a scanning head 32. As noted earlier, and as may be best observed in FIG. 5, the wire guide 22 has end portions **22*a*, 22*b* which open toward the supply reel 14 and takeup reel 16, respectively. The magnetic recording wire 18 extends through the guide 22 and has its ends secured to and wrapped in opposite directions about the reels. In the illustrated embodiment of the invention, for example, the recording wire is wound in the counterclockwise direction, as viewed in FIG. 1, about the supply reel 14 and in the clockwise direction about the takeup reel 16. As noted earlier and shown in FIG. 5, the ends 22*a*, 22*b* of the wire guide 22 preferably open generally tangentially of and in the direction in which the recording wire is wrapped around their respective adjacent reels. It is evident from the foregoing description and from the drawings that counterclockwise or forward rotation of the carrier 24 is effective to unwind the recording wire 18 from the supply reel 14 and to simultaneously wind the wire on the takeup reel 16 in such a way that the wire is fed or transported lengthwise from the supply reel to the takeup reel through the wire guide 22**. Similarly, clockwise or rewind rotation of the carrier is effective to unwind the wire from the takeup reel and to simultaneously wind the wire on the supply reel in such a way that the wire is transported or fed endwise through the wire guide from the takeup reel to the supply reel.

The scanning head 32, which in this instance is a conventional magnetic wire recording head, is mounted on the carrier 24 between the ends **22*a*, 22*b* of the wire guide 22 and in magnetic recording-playback relation to the path of movement of the recording wire 18 through the guide. The leads 140 of the magnetic recording head 32 extend from the head through an opening in the wall of the sleeve 54 on the rear end of the hollow takeup reel supporting shaft 56 and then through this shaft to a slip-ring assembly 142 secured to the front end of the shaft, forwardly of the front frame wall 42. This slip-ring assembly has a pair of slip-rings 144 disposed side-by-side and electrically insulated from one another and from the takeup reel shaft 56. The two magnetic head leads 140 are electrically connected to the two slip-rings, respectively. Mounted on the front side of the front frame wall 42, adjacent the slip-rings 144 is a bracket 146 mounting a pair of slip-ring contacts or brushes 148 which bear slidably against the slip-rings, respectively. The slip-ring brushes 148 are electrically insulated from one another and from machine frame 12 and are electrically connected to leads of an electrical cable 150. Cable 150** connects to an external electronic system (not shown) for impressing on the scanning head 32 an electrical signal to be recorded during the recording mode of the wire recorder and detecting and utilizing the output of the head during the playback mode of the recorder. At this point, it is significant to recall that the carrier 24 and sleeve 54 are operatively connected by the drive pin 68 on the carrier and the drive arm 70 on the sleeve in such a way that the carrier, sleeve, and the sleeve shaft 56 rotate in unison, while the carrier is free to reciprocate axially relative to the sleeve and shaft. It will be observed that this arrangement accommodates extension of the magnetic scanning head leads 140 from the head through the sleeve and shaft to the slip-ring assembly 142 without twisting the leads during rotation of the head with its carrier 24.

Considering the operation of the wire recorder 10 to this point, and assuming that the magnetic recording wire 18 is initially fully wound on the supply reel 14, the recorder is operated in its recording mode by energizing the drive motor 72 in a direction to drive the carrier 24 in its forward direction and simultaneously reciprocate the carrier in timed relation to its rotation. During this synchronized rotation and reciprocation of the carrier, the magnetic recording wire 18 is fed endwise from the supply reel 14, through the wire guide 22, to the takeup reel 16 in such a way that the wire travels past the magnetic scanning head 32 in magnetic recording relation thereto. Owing to reciprocation of the carrier in timed relation to its rotation, the recording wire is wound on the takeup reel in a series of uniform multi-coiled layers. In this recording mode, the electrical signal to be recorded is impressed on the recording head 32 through the input cable 150, the slip-ring assembly 142 and the magnetic head leads 140 to activate the head and thereby effect recording of the signal on the magnetic recording wire. After the recording is completed, the motor 72 may be energized to drive the carrier 24 in its rewind direction and thereby rewind the magnetic recording wire 18 on the supply reel 14. In this case, during the playback mode of the recorder, the carrier 24 is again driven in its forward direction to feed the magnetic recording wire 18 from the supply reel to the takeup reel and past the magnetic scanning head. The output from the head is fed to the external amplifying equipment through the leads 140, slip-ring assembly 142, and cable 150. As noted earlier, in some applications of the recorder, such as the aircraft flight recorder application, an alternative recording and playback procedure may be followed involving recording during forward transfer of the wire to the takeup reel and playback during rapid rewind of the wire on the supply reel. This achieves a slow recording speed, as required to monitor prolonged aircraft flights, and rapid data retrieval for crash and/or other flight analysis.

As noted earlier, the present strip transport mechanism or wire recorder 10 embodies tensioning means 30 for compensating the changes in effective supply and takeup reel diameters and maintaining a predetermined tension in the magnetic recording wire 18 as the latter travels past the magnetic scanning head 32. The illustrated tensioning means comprises a pulley 152 fixed on the main drive shaft 78 between the frame walls 44, 46. Extending between and rotatably suppotred at its ends in these walls, in spaced parallel relation to the shaft 78, is a shaft 154 mounting a pulley 156 around which and the pulley 152 is trained a belt 158. Extending through and rotatably supported in the three-frame walls 42, 44, and 46, in spaced parallel relation to the shaft 154, is a long shaft 160. Shafts 154, 160 are drivably coupled through an automatic reversing mechanism 162 (FIG. 6). This reversing mechanism includes an input or driving gear 164 which is fixed on the shaft 154 and meshes with an idler pinion 166. Idler pinion 166 has its axis parallel to the shaft 154 and is journaled in a yoke-shaped carriage 168 similar to the idler pinion carriage 88 in the automatic variable ratio transmission 86. The arms of carriage 168, like those of carriage 88, are rotatably supported with a light friction fit on the shaft 154 in straddling relation to the input gear 164. It will be understood, therefore, that the carriage 168 tends to rotate with the shaft 154. Clockwise or forward rotation of the shaft 154 with the main shaft 78 rotates the idler pinion carriage 168 to a position wherein the idler pinion 166 meshes with a gear 170. Gear 170 is rotatably supported by a shaft 172 extending between the frame walls 44, 46 in spaced parallel relation to the shaft 154. Counterclockwise or rewind rotation of the shaft 154 with the main shaft 78 rotates the idler pinion carriage 168 to a position wherein the idler pinion 166 meshes with a gear 172 fixed on the long shaft 160. Gears 170, 172 are drivably coupled through a pair of idler gears 174, rotatably mounted on shafts 176 extending between and supported at their ends on the frame walls 44, 46 in spaced parallel relation to the shaft 154. It is evident at this point that when the drive motor 72 is energized to drive the main shaft 78 and hence the input shaft 154 of the reversing mechanism 162 in their clockwise or forward directions of rotations, the reversing mechanism shifts automatically to couple the input shaft to the output shaft 160 of the reversing mechanism through the idler pinion 166 and the reversing gears 170, 174, and 172. The output shaft is then driven in a counterclockwise direction of rotation in FIGS. 1 and 6. Reverse energizing of the motor to drive the main shaft 78 and input shaft 154 in their counterclockwise or rewind directions of rotation causes automatic shifting of the reversing mechanism 162 to couple the input shaft directly to the output shaft through the idler pinion 166 and the reversing gear 172. Under these conditions, the output shaft is again driven in the counterclockwise direction of rotation. Thus, the reversing mechanism 162 is operative to cause counterclockwise rotation of the output shaft 160 during rotation of the main shaft 78 in either direction by the drive motor 72. It is significant to note that the ratio of the reversing mechanism remains the same in both of its positions, whereby the speed of rotation of the output shaft is the same in both directions of rotation of the main shaft.

The front end of the ouput shaft 160 of the reversing mechanism 162 is drivably coupled to the takeup reel 16 through a slip-clutch 176 and a gear train 178. This gear train includes an input gear 180 rigid on the output member of the slip-clutch 176 and output gear 182 rigid on the takeup reel. Thus, energizing of the drive motor 72 in either direction is effective to produce a torque on the takeup reel 16 in the direction of which the recording wire 18 is wrapped around the reel. In this regard, it is significant to recall that the takeup reel is supported for rotation on the shaft 56.

The operation of the illustrated wire recorder 10 of the invention is believed to be obvious from the foregoing description. Thus, assuming that the magnetic recording wire 18 is initially fully wound on the supply reel 14, the motor 72 is energized to drive the main shaft 78 in its forward direction of rotation. The variable ratio transmission 86 then shifts automatically to couple the main shaft to the magnetic head carrier shaft 48 through the forward drive means 34 in such a way that the shaft 48 is driven in its forward (clockwise) direction of rotation at a relatively slow constant speed. This forward rotation of the shaft causes relatively slow constant speed rotation of the magnetic head carrier 24 in its forward direction of rotation and simultaneous axial reciprocation of the carrier along the common axis 26 of the supply and take up reels 14, 16, thereby to feed or transport the magnetic recording wire 18 from the supply reel 14, past the magnetic recording head 32, to the takeup reel 16. Concurrently, the automatic reversing mechanism 162 shifts to effect driving of its output shaft 160 in the counterclockwise direction, thereby to produce a predetermined counterclockwise torque on the takeup reel 16 for maintaining a predetermined tension in the magnetic recording wire. In the rewind mode of the recorder, the drive motor 72 is energized to drive the main shaft 78 in its rewind direction. The variable ratio transmission 86 then shifts automatically to couple the main shaft to the carrier shaft 48 through the rewind means 36 in such a way as to drive the latter shaft at a high speed of rotation in its rewind direction. The magnetic recording wire 18 is then rapidly rewound from the takeup reel 16 onto the supply reel 14. Concurrently, the automatic reversing mechanism 162 shifts to couple its output shaft 160 to the main shaft 48 in such a way as to again cause rotation of the output shaft in the counterclockwise direction and thereby again produce a predetermined counterclockwise torque on the takeup reel 16 for maintaining a predetermined tension in the recording wire. It will be immediately recognized by those versed in the art that a variety of drive mechanism, other than the particular mechanism illustrated, may be utilized to drivably couple the carrier 24 and the takeup reel 16 to the recorder drive motor 72.

The present wire recorder possesses several advantages. These several advantages collectively adapt the present recorder for its intended use as a flight data recorder for commercial aircraft and the like. Among the foremost of the advantages of the present wire recorder are maximum data storage per unit weight; elimination of the stresses, recording head wear, high drop-out rate, and azimuth alignment problems which attend may tape recorders and magnetic metal foil recorders; capability of multi-channel maintenance data recording of voluminous digital data with a relatively low-cost single track recording head in contrast to the relatively high cost multitrack heads required in multichannel tape recording equipment; and minimum overall size, weight, complexity and cost of the recording equipment. Other highly important advantages of the present wire recorder resides in the fact that the wire reels and scanning head have a compact and inherently impact resistant configuration and are adapted for enclosure within a spherical or prolate spheroid shock and flame resistant cartridge, as explained below, so as to render these parts relatively insensitive to the impacts and high temperatures encountered in aircraft crashes. Another advantage is the relatively low dynamic or inertial forces of the moving recorder parts, whereby snarling and breakage of the recording wire during rapid starting, stopping, and reversal of the recorder are eliminated. In this regard, it is significant to note that the relatively great inertial masses represented by the supply and takeup reels 14, 16 and the magnetic recording wire 18 wound thereon are effectively stationary and that the relatively light-weight, low inertial mass represented by the magnetic head carrier 24 is the major rotating mass of the recorder. This unique recorder configuration also eliminates the clutches, brakes, and other complex mechanisms required in conventional wire recorders to accommodate fast starts, stops, and reversals without overloading of the recording medium. As a consequence, the present wire recorder is characterized by substantially greater simplicity of construction, smaller size, lower mass, and greater operational reliability than conventional wire recorders.

Figures 7, 8:
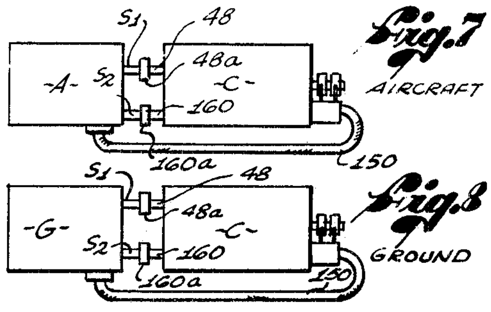
FIGS. 7 and 8 illustrate certain modifications which may be employed when utilizing the present wire recorder as an aircraft flight data recorder.

While the present wire recorder is ideally suited for use as a flight data or crash recorder, the recorder configuration described above and illustrated in FIGS. 1 through 6 does not represent the ideal configuration for this purpose. FIGS. 7 and 8 illustrate the optimum recorder configuration. In these latter figures, the reference character C denotes a record cartridge including the recorder components enclosed within the broken line box C in FIG. 1. These components include the supply and takeup reels 14, 16, the carrier 24 and its scanning head 32, the carrier drive shaft 48 and its associated gear train **113, 113*a*, 116, 120, 124, 132, and the wire tensioning drive shaft 160 and its associated wire tensioning means 176, 178. These several cartridge components will be enclosed in a suitable shock and flame resistant housing of the kind referred to earlier in such a way that the ends of the two shafts 48, 160** are exposed, as shown.

The reference characters A and G in FIGS. 7 and 8 designate two separate, combined electronic and scanning head carrier drive units to be installed in an aircraft and a ground data retrieval station, respectively. The aircraft unit A will contain suitable recording electronics for energizing the scanning head 32 of the record cartridge C with the flight data signals to be recorded. In addition, the aircraft unit will contain a suitable recording drive mechanism for driving the record cartridge shafts 48, 160 at the proper speeds and in the proper directions to drive the scanning head carrier 24 in the cartridge in its forward or record direction and maintain the proper tension in the magnetic recording wire 18. To this end, the drive mechanism in the aircraft unit A has output shafts $S_1$, $S_2$ which may be connected, by coupling means **48*a*, 160*a*, to the record cartridge shafts 48, 160**, respectively, to drive the latter shafts in the manner just explained.

It will now be understood, that the recorder configuration illustrated in FIG. 7 is designed for operation in the recording mode only onboard an aircraft. In this recording mode, the record cartridge C is mechanically and electrically powered from the aircraft unit A to transport the magnetic recording wire 18, at recording speed, from the cartridge supply reel 14 to the cartridge takeup reel 16 and simultaneously record flight data on the wire. During this recording mode, the cable 150 of the record cartridge is plugged into the aircraft unit to carry the data signals being recorded from the latter unit to the cartridge.

The ground unit G will contain a suitable drive mechanism for driving the record cartridge shafts 48, 160 at the proper speeds and in the proper directions to drive the scanning head carrier 24 in its rapid rewind rotation while maintaining proper tension in the magnetic recording wire 18. In addition, the ground unit will contain suitable playback electronics for amplifying and feeding to a computer or other data receiver the recorded flight data on the wire. The drive mechanism in the ground unit, like that in the aircraft unit, is equipped with output shafts $S_1$ and $S_2$ which may be drivably coupled to the cartridge shafts 48, 160, respectively, for driving these shafts in the manner just explained. The recorder configuration of FIG. 8 is designed for operation in the playback mode only. During this playback mode, the magnetic recording wire 18 is transported, at rapid rewind speed, from the cartridge takeup reel 16 to the cartridge supply reel 14, and the recorded data on the wire is simultaneously retrieved and fed to the ground unit through the cartridge cable 150.

As noted earlier, the electrical signals to be recorded are fed to the magnetic recording head 32, and the signals from the head are fed to the external playback unit, through the slip-ring assembly 142. According to the present invention, the high level signals to be recorded are fed directly to the head, while the low level playback signals from the head are fed through a small solid state pre-amplifier which may be mounted directly on the head carrier 24 for amplifying the playback signals above the noise level introduced by the slip-ring assembly.

What is claimed as new in support of Letters Patent is:

1. A strip transport mechanism comprising:

a frame;

a pair of fixed reels supported on said frame in coaxial relation;

a strip guide extending between and having opposite ends opening toward said reels, respectively, for receiving therethrough a strip having its ends wound in opposite directions about and secured to said reels;

means supporting said guide on said frame for rotation about the common axis of said reels;

means for driving said guide in rotation about said axis to transport said strip endwise from one reel, through said guide, to the other reel; and strip tensioning means operatively connected to one reel for yieldably urging the latter reel in one direction about said axis.

2. A strip transport mechanism comprising:

a frame;

a pair of fixed reels supported on said frame in coaxial relation;

a strip guide extending between and having opposite ends opening toward said reels, respectively, for receiving therethrough a strip having its ends wound in opposite directions about and secured to said reels;

means supporting said guide on said frame for rotation about the common axis of said reels;

means for driving said guide in rotation about said axis to transport said strip endwise from one reel, through said guide, to the other reel;

means for driving said guide in reciprocation along said axis in timed relation to rotation of said guide about said axis; and strip tensioning means operatively connected to one reel for yieldably urging the latter reel in one direction about said axis.

3. A strip transport mechanism according to claim 1, wherein:

said reels are disposed in axially spaced relation; and said supporting means comprise shaft means extending between said reels along said axis, means supporting said shaft means for rotation on said axis, and a carrier mounting said guide and secured to said shaft means for rotation therewith.

4. A strip transport mechanism comprising:

a frame;

a pair of fixed reels supported on said frame in coaxial relation;

a strip guide extending between and having opposite ends opening toward said reels, respectively, for receiving therethrough a strip having its ends wound in opposite directions about and secured to said reels;

means supporting said guide on said frame for rotation about the common axis of said reels;

means for selectively driving said guide in rotation in either direction about said axis to transport said strip endwise from either reel, through said guide, to the other reel; and tensioning means operatively connected to one reel for yieldably urging the latter reel in a given direction about said axis regardless of the direction of rotation of said guide.

5. A strip transport mechanism comprising:

a frame;

a pair of fixed reels supported on said frame in coaxial relation;

a strip guide extending between and having opposite ends opening towards said reels, respectively, for receiving therethrough a strip having its ends wound in opposite directions about and secured to said reels;

means supporting said guide on said frame for rotation about the common axis of said reels;

means including an accessible rotary driving shaft for driving said guide in rotation about said axis to transport said strip endwise from one reel, through said guide, to the other reel; and strip tensioning means including a second accessible rotary driving shaft operatively connected to one reel for yieldably urging the latter reel in one direction about said axis.

6. A strip transport mechanism comprising:

a frame;

a pair of fixed reels supported on said frame in coaxial relation;

a strip guide extending between and having opposite ends opening toward said reels, respectively, for receiving therethrough a strip having its ends wound in opposite directions about and secured to said reels;

means supporting said guide on said frame for rotation about the common axis of said reels;

means including an accessible rotary driving shaft for driving said guide in rotation about said axis to transport said strip endwise from one reel, through said guide, to the other reel;

means supporting said guide on said frame for reciprocation along said axis;

a first driving connection between said guide and shaft for transmitting driving torque from said shaft to said guide while permitting axial reciprocation of said guide relative to said shaft; and a second driving connection between said shaft and guide, whereby said guide is driven in axial reciprocation by said shaft in timed relation to rotation of said guide by said shaft.

7. A strip transport mechanism according to claim 6, wherein:

said first driving connection comprises means for driving said guide at a rotary speed which differs from the rotary speed of said shaft, whereby said guide and shaft undergo relative rotation; and said second driving connection comprises means for imparting axial reciprocating motion to said guide in response to relative rotation of said shaft and guide.

8. A strip transport mechanism according to claim 7, wherein:

said shaft extends along said axis;

said reels are disposed in axially spaced relation;

said supporting means comprise a sleeve rotatably receiving one end of said shaft and extending along said axis between said reels, and a carrier fixed to said sleeve between said reels for rotation with said sleeve and mounting said guide;

said first driving connection comprises a longitudinally elongated gear rotatably mounted on said frame in spaced parallel relation to said axis, a pinion fixed to said sleeve in meshing engagement with and movable along said gear, and means drivably connecting said shaft and gear; and said second driving connection comprises a double helix groove formed in said one end of said shaft, and a helix follower carried by said sleeve and engaging in said groove.

9. A strip transport mechanism comprising:

a frame;

a pair of fixed reels supported on said frame in coaxial relation;

a strip guide extending between and having its ends opening towards said reels, respectively, for receiving therethrough a strip having its ends wound in opposite directions about and secured to said reels;

means supporting said guide on said frame for rotation about the common axis of said reels;

means including a driving shaft for driving said guide in rotation about said axis to transport said strip endwise from one reel through said guide to the other reel;

said shaft having an exposed end;

a drive unit having an exposed driving shaft; and releasable coupling means connecting said shafts.

10. A strip transport mechanism according to claim 9, including:

strip tensioning means including a second rotary shaft and means connecting said second shaft and one of said reels, whereby rotation of said second shaft urges said latter reel in one direction about said axis;

said drive unit comprises a second driving shaft; and releasable coupling means connecting said second shafts.

11. A strip transport mechanism comprising:

a pair of fixed reels supported on said frames in coaxial relation;

a strip guide extending between and having its ends opening towards said reels, respectively;

a long flexible strip extending endwise through said guide and having its ends wrapped in opposite directions about and secured to said reels, respectively;

means supporting said guide on said frame for rotation about the common axis of said reels;

means for driving said guide in rotation about said axis to simultaneously unwind said strip from one reel, feed said strip endwise through said guide to the other reel, and wind said strip on said other reel; and tensioning means operatively connected to one reel for yieldably urging the latter reel about said axis in the direction in which the corresponding end of said strip is wound on the latter reel to maintain a generally constant tension in said strip.

12. A strip transport mechanism comprising:

a pair of fixed reels supported on said frames in coaxial relation;

a strip guide extending between and having its ends opening towards said reels, respectively;

a long flexible strip extending endwise through said guide and having its ends wrapped in opposite directions about and secured to said reels, respectively;

means supporting said guide on said frame for rotation about the common axis of said reels;

means for driving said guide in rotation about said axis to simultaneously unwind said strip from one reel, feed said strip endwise through said guide to the other reel, and wind said strip on said other reel;

said reels being disposed in axially spaced relation; and said supporting means comprising shaft means on said axis between said reels, means rotatably supporting said shaft means on said frame, and a carrier fixed to said shaft means between said reels for rotation with said shaft means and mounting said guide.

13. An information recording and playback mechanism for recording information on and retrieving information from an information storage medium in the form of a long flexible strip comprising:

a frame;

a pair of fixed reels supported on said frame in coaxial relation;

a strip guide extending between and having opposite ends opening toward said reels, respectively;

means for driving said guide in rotation about said axis;

said information storage medium being adapted to be threaded endwise through said guide and to have its ends secured to and wound in opposite directions around said reels, respectively, whereby rotation of said guide is effective to transport said information storage medium endwise from one reel through said guide to the other reel;

a scanning head mounted on said guide in information transfer relation to the path of movement of said storage medium through said guide; and tensioning means operatively connected to one reel for urging the latter reel in one direction about said axis to maintain a generally constant tension in said recording medium.

14. An information recording and playback mechanism for recording information on and retrieving information from an information storage medium in the form of a long flexible strip comprising:

a frame;

a pair of fixed reels supported on said frame in coaxial relation;

a strip guide extending between and having opposite ends opening toward said reels, respectively;

means for driving said guide in rotation about said axis;

said information storage medium being adapted to be threaded endwise through said guide and to have its ends secured to and wound in opposite directions around said reels, respectively, whereby rotation of said guide is effective to transport said information storage medium endwise from one reel through said guide to the other reel;

a scanning head mounted on said guide in information transfer relation to the path of movement of said storage medium through said guide;

said information storage medium being a magnetic recording wire;

said supporting means comprising means supporting said guide on said frame for reciprocation along said axis concurrently with rotation of said guide about said axis;

said mechanism further comprising means for driving said guide in reciprocation along said axis in timed relation to rotation of said guide about said axis, whereby said wire is wound on said reels in uniform multicoil layers; and said scanning head comprising a magnetic recording and playback head.

15. An information recording and playback mechanism for recording information on and retrieving information for an information storage medium in the form of a long flexible strip comprising:

a frame;

a pair of fixed reels supported on said frame in coaxial relation;

a strip guide extending between and having opposite ends opening toward said reels, respectively;

means for driving said guide in rotation about said axis;

said information storage medium being adapted to be threaded endwise through said guide and to have its ends secured to and wound in opposite directions around said reels, respectively, whereby rotation of said guide is effective to transport said information storage medium endwise from one reel through said guide to the other reel;

a scanning head mounted on said guide in information transfer relation to the path of movement of said storage medium through said guide;

one of said reels comprising a supply reel and the other reel comprises a takeup reel; and said driving means comprising forward driving means for driving said guide at a relatively slow speed in one direction of rotation to transport said recording medium from said supply reel to said takeup reel, and rewind driving means for driving said guide at a relatively high speed in the opposite direction of rotation to transport said recording medium from said takeup reel to said supply reel.

16. An information recording and playback mechanism according to claim 15, wherein:

said information storage medium is a magnetic recording wire;

said scanning head comprises a magnetic recording and playback head;

said supporting means comprise means supporting said guide on said frame for reciprocation along said axis concurrently with rotation of said guide about said axis; and said mechanism further comprises means for driving said guide in reciprocation along said axis in timed relation to rotation of said guide about said axis, whereby said wire is wound on said reels in uniform multicoil layers, and tensioning means operatively connected to one reel for yieldably urging the latter reel in one direction about said axis regardless of the direction of rotation of said guide to maintain a generally constant tension in said wire.

17. A magnetic wire recorder comprising:

a frame;

a pair of fixed reels supported on said frame in coaxial relation;
a wire guide extending between and having opposite ends opening toward said reels, respectively;
means supporting said guide on said frame for rotation about and reciprocation along the common axis of said reels;
a magnetic recording wire extending through said guide and having its ends secured to and wound in opposite directions about said reels, respectively;
means for driving said guide in rotation about and reciprocation along said axis to transport said wire endwise from one reel through said guide to the other reel and wind said wire in uniform multicoil layers on the latter reel;
a magnetic recording and playback head mounted on said guide in magnetic recording and playback relation to said wire; and
tensioning means operatively connected to one reel for yieldably urging the latter reel in one direction about said axis to maintain a generally constant tension in said wire.

18. A wire recorder according to claim 17, wherein:
one of said reels comprises a supply reel and the other reel comprises a takeup reel; and
said driving means comprise forward driving means for driving said guide at a relatively slow speed in one direction of rotation to feed said wire from said supply reel to said takeup reel, and rewind driving means for driving said guide at a relatively high speed in the opposite direction of rotation to feed said wire from said takeup reel to said supply reel.

19. A cartridge for an aircraft flight data recorder comprising:
a frame;
a supply reel and a takeup reel supported on said frame in coaxial relation;
a strip guide extending between and having opposite ends opening toward said reels, respectively;
means supporting said guide on said frame for rotation about the common axis of said reels;
a recording medium in the form of a long flexible strip extending through said guide and having its ends secured to and wound in opposite directions about said reels, respectively;
a recording and playback head mounted on said guide in recording and playback relation to said medium; and
means including a driving shaft accessible externally of said cartridge and adapted to be driven in rotation for driving said guide in rotation about said axis to transport said medium endwise from one reel through said guide to the other reel.

20. A cartridge according to claim 19, wherein:
said shaft is rotatable in one direction to rotate said guide in a direction to feed said medium from said supply reel to said takeup reel, and said shaft is rotatable in the opposite direction to rotate said guide in a direction to feed said medium from said takeup reel to said supply reel.

21. A cartridge according to claim 20 in combination with:
a drive unit to be installed onboard an aircraft including an externally accessible driving shaft for driving said cartridge shaft at a relatively slow speed in said one direction, and coupling means for releasably connecting said shafts.

22. A cartridge according to claim 20 in combination with:
a drive unit to be located at a ground data retrieval station and including an externally accessible driving shaft for driving said cartridge shaft at a relatively high speed in said opposite direction of rotation, and coupling means for releasably connecting said shafts.

23. A cartridge according to claim 20 in combination with:
a first cartridge drive unit to be installed onboard an aircraft including an externally accessible driving shaft for driving said cartridge shaft at a relatively slow speed in said one direction;
a second driving unit to be located at a ground data retrieval station and including an externally accesible driving shaft for driving said cartridge shaft at a relatively high speed in said opposite direction of rotation; and
releasable coupling means on said shafts for selectively coupling the driving shafts of said first and second units to said cartridge shaft.

24. The combination according to claim 23, wherein:
said cartridge further comprises tensioning means including a second accessible rotary shaft, and means operatively connecting said second shaft to one reel for yieldably urging the latter reel in one direction to maintain a generally constant tension in said medium in response to rotation of said second shaft in a given direction; and
releasable coupling means for connecting the second shaft of each drive unit to said second cartridge shaft.

References Cited

UNITED STATES PATENTS

| | | | |
|---|---|---|---|
| 2,713,618 | 7/1955 | McNabb | 179—100.2 |
| 2,982,488 | 5/1961 | Bailey | 242—54.1 |
| 3,430,879 | 3/1969 | Boyer | 242—55.12 |

LEONARD D. CHRISTIAN, Primary Examiner

U.S. Cl. X.R.

242—193